United States Patent [19]
Tangren

[11] Patent Number: 6,023,574
[45] Date of Patent: Feb. 8, 2000

[54] METHOD FOR DESIGNING AND MANUFACTURING A SUSPENSION HAVING OPTIMIZED SIDE PROFILE

[75] Inventor: John H. Tangren, St. Paul, Minn.

[73] Assignee: Hutchinson Technology Incorporated, Hutchinson, Minn.

[21] Appl. No.: 08/828,339

[22] Filed: Mar. 28, 1997

Related U.S. Application Data

[60] Provisional application No. 60/014,605, Mar. 29, 1996.

[51] Int. Cl.$^7$ ........................................... G06F 9/455
[52] U.S. Cl. ...................... 395/500.28; 395/500.23; 395/500.29; 72/31.01; 29/603.01; 29/604; 360/104
[58] Field of Search ................... 29/604, 603.01; 72/31.01; 360/104, 109; 364/512, 578; 395/500.23, 500.28, 500.29

[56] References Cited

U.S. PATENT DOCUMENTS

| | | | |
|---|---|---|---|
| 5,313,353 | 5/1994 | Kosho et al. | 360/104 |
| 5,781,381 | 7/1998 | Koganezawa et al. | 360/106 |
| 5,796,553 | 8/1998 | Tangren | 360/104 |
| 5,835,307 | 11/1998 | Sone | 360/104 |

*Primary Examiner*—Kevin J. Teska
*Assistant Examiner*—Samuel Broda
*Attorney, Agent, or Firm*—Faegre & Benson LLP

[57] ABSTRACT

A method for designing and manufacturing a head suspension assembly having a side profile in the radius and rigid regions which is optimized for first and second torsion or other resonance characteristics.

17 Claims, 12 Drawing Sheets

FIG. 13

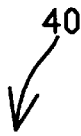
40

I  Provide a 0 gram, 0 offset height FEA model of the suspension loadbeam.

II  Generate a plurality of profile/resonance characterizing variations of the model. Each characterizing variation should have a different side profile.

III  For each resonance characteristic for which the suspension is being optimized, determine a side profile description and resonance characteristic response for each profile/resonance characterizing variation of the model.

IV  For each resonance characteristic for which the suspension is being optimized, generate from the associated side profile descriptions and resonance characteristic responses for the profile/resonance characterizing varitions, a profile/resonance equation describing the resonance characteristic response as a function of the profile description.

V  Limit the range of possible solutions to each profile/resonance equation.

VI  Solve the profile/resonance equations.

I  Load the 0 gram, 0 offset height FEA model of the suspension load beam with the appropriate gram load.

II  Determine a deflected side profile description for the loaded model.

III  Subtract the deflected side profile from the optimized side profile generated by method 40.

FIG. 19

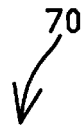

I   Add displacement constraints to deform the suspension model to the desired deformed profile (initially the optimized load compensated free state profile).

II  Perform a plastic stress analysis on the deformed suspension model using the stress-strain curve.

III Using the plastic stress analysis results, determine the resulting free state profile of the suspension model when the displacement constraints are removed.

IV Compute suspension model spring back by subtracting the resulting free state profile from the desired deformed profile.

V  Add the computed spring back to the desired deformed profile to determine the next iteration deformed profile.

VI Repeat steps I-V with the next iteration desired deformed profile until the resulting free state profile equals the optimized load compensated free state profile.

METHOD FOR DESIGNING AND MANUFACTURING A SUSPENSION HAVING OPTIMIZED SIDE PROFILE

REFERENCE TO RELATED APPLICATION

This application claims the benefit of U.S. Provisional Application Ser. No. 60/014,605, filed Mar. 29, 1996.

BACKGROUND OF THE INVENTION

1. Field of the Invention

The present invention relates generally to the design and manufacture of disk drive head suspensions. In particular, the present invention is method for designing and manufacturing suspensions having optimized side profiles.

2. Description of the Related Art

Head gimbal assemblies (HGAs), also sometimes known as head suspension assemblies (HSAs), are commonly used in rigid magnetic disk drives to support magnetic heads in close proximity to the rotating disk surfaces. Suspension assemblies of this type typically include an air bearing head slider assembly mounted to a suspension. The suspension includes a load beam having a mounting region on its proximal end and a gimbal or flexure on its distal end. When incorporated into a disk drive the mounting region is mounted to an actuator or positioning arm which supports the suspension assembly over the rotating disk. A baseplate is typically welded to the mounting region to increase the rigidity of the mounting region and to provide a mechanism for securely mounting the suspension assembly to the positioning arm. The load beam is an elongated and often generally triangularly-shaped member which includes a spring region adjacent to the mounting region, and a rigid region which extends from the spring region. The flexure can be manufactured as a separate member and welded to the distal end of the load beam, or formed as an integral member in the distal end of the load beam. The air bearing head slider assembly contains a magnetic head and is typically bonded to the flexure by adhesive. The flexure allows the head slider assembly to move or "gimbal" (about rotational pitch and roll axes) with respect to the distal end of the load beam and thereby follow variations in the surface of the spinning disk. To enable the pivotal flexure movement, the surface of the flexure to which the head slider assembly is bonded is typically spaced from the adjacent surface of the load beam by structures known as load point dimples or formed offsets.

Suspensions are commonly manufactured by chemically etching flat or unformed load blanks from thin sheets of stainless steel. Flat and unformed flexure blanks are etched in a similar manner from sheets of stainless steel. During subsequent manufacturing operations side rails, load point dimples and any other structures which extend upwardly or downwardly from the web or generally planar surface of the load beam are formed on the load beam blanks. Any dimples, offsets or other structures on the flexures requiring deformation of this type are formed in a similar manner. After forming, the flexures are welded to the distal end of the load beams. Baseplates are also welded to the suspensions following the forming operations.

The product of these etching, welding and forming operations are generally flat suspensions (i.e., the mounting region, spring region and rigid region of the load beam are generally coplanar and at the same height. During subsequent manufacturing operations the spring region of the load beam is rolled around a curved mandrel or otherwise bent in such a manner as to plastically bend or permanently deform the spring region. The rolling operation imparts a curved shape to the spring region and causes the flexure to be offset from the mounting region when the suspension is in its unloaded or free state.

As noted above, the suspension supports the slider assembly over the magnetic disk. In reaction to the air pressure at the surface of the spinning disk, the slider assembly develops an aerodynamic force which causes the slider assembly to lift away from and "fly" over the disk surface. To counteract this hydrodynamic lifting force, the head suspension assembly is mounted to the disk drive with the suspension in a loaded state so the bent spring region of the suspension forces the head slider assembly toward the magnetic disk. The height at which the slider assembly flies over the disk surface is known as the "fly height." The force exerted by the suspension on the slider assembly when the slider assembly is at fly height is known as the "gram load."

An important performance-related criteria of a suspension is specified in terms of its resonance characteristics. In order for the head slider assembly to be accurately positioned with respect to a desired track on the magnetic disk, the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension can cause the position of the head slider assembly to deviate from its intended position with respect to the desired track. Since the head suspension assemblies must be driven at high rates of speed in high performance disk drives, it is desirable for the resonant frequencies of a suspension to be as high as possible. The detrimental effects of the bending and twisting at the resonance frequencies can also be reduced by minimizing the extent of the bending and twisting motion of the suspension (also known as the gain) at the resonant frequencies.

Common bending and twisting modes of suspensions are generally known and discussed, for example, in the Yumura et al. U.S. Pat. No. 5,339,208 and the Hatch et al. U.S. Pat. No. 5,471,734. Modes which result in lateral or transverse motion (also known as off-track motion) of the head slider are particularly detrimental since this motion causes the head slider to move from the desired track on the disk toward an adjacent track. The three primary modes which produce this transverse motion are known as the sway, first torsion and second torsion modes. The sway mode is a lateral bending mode (i.e., the suspension bends in the transverse direction along its entire length. The first and second torsion modes are twisting modes during which the suspension twists about a rotational axis which extends along the length of the suspension. The first and second torsion modes produce transverse motion of the head slider if the center of rotation of the suspension is not aligned with the gimbal point of the head slider.

Various techniques for compensating for the detrimental effect of resonance modes are known. The Yumura et al. U.S. Pat. No. 5,471,734, for example, states that it is desirable to locate the shear center at the gimbal contact point between the flexure and load beam. The Hatch et al. U.S. Pat. No. 5,339,208 notes that the position, shape and size of the roll or bend in the spring region of the suspension, characteristics sometimes referred to as the radius geometry or radius profile of the suspension, can affect resonance characteristics. The Hatch et al. patent also discloses a fabrication method which uses computational finite element analysis to optimize the suspension radius region and dynamically decouple the head slider from the torsional motion of the rest of the suspension and/or to maximize the resonant frequency of the sway mode.

There remains, however, a continuing need for suspensions having improved resonance characteristics. In particular, there is a need for methods for designing and manufacturing suspensions having optimized resonance characteristics. Methods for designing and manufacturing suspensions which are optimized for several resonance characteristics would be particularly advantageous.

SUMMARY OF THE INVENTION

The present invention is a method for determining the side profile of a suspension to optimize for one or more selected resonance characteristics. The method makes use of a flat model of the suspension for which the profile is being determined, and includes generating a plurality of profile/resonance characterizing variations of the model. Each characterizing variation has a different side profile through at least the rigid region of the suspension. For each selected resonance characteristic, the profile description and resonance characteristic response of the characterizing variations are determined. For each selected resonance characteristic, and from the associated profile descriptions and resonance characteristic responses, a numeric profile/resonance equation describing the resonance characteristic response as a function of the profile is generated. The optimum suspension profile description is determined by solving the profile/resonance equations for the desired resonance response characteristic.

In a preferred embodiment, the profile design method is performed through the use of computerized finite element analysis (FEA). The method can be used to determine the side profile of both the rigid and spring regions of a suspension that will have optimized first and second torsion responses.

Yet another embodiment of the invention makes use of the profile design method to determine the optimum loaded state side profile of the suspension, and includes a loaded state compensation method for determining an optimum load compensated free state profile of the suspension. The loaded state compensation method includes determining a compensation profile description of the flat model at the desired loaded state, and subtracting the compensation profile from the optimum loaded state side profile to determine the optimum load compensated free state side profile of the suspension. FEA can be used to perform the loaded state compensation method.

Yet another embodiment of the invention includes determining an optimized forming tool profile which can be used to form a flat suspension to the optimum load compensated free state side profile. A forming tool having the optimized profile can then be provided, and used to manufacture suspensions having the optimized free state profile.

BRIEF DESCRIPTION OF THE DRAWINGS

FIG. 13 is a description of the load beam profile design method of the present invention.

FIG. 19 is a description of a forming die profile design method in accordance with the present invention.

DETAILED DESCRIPTION OF THE PREFERRED EMBODIMENTS

Figure 1:
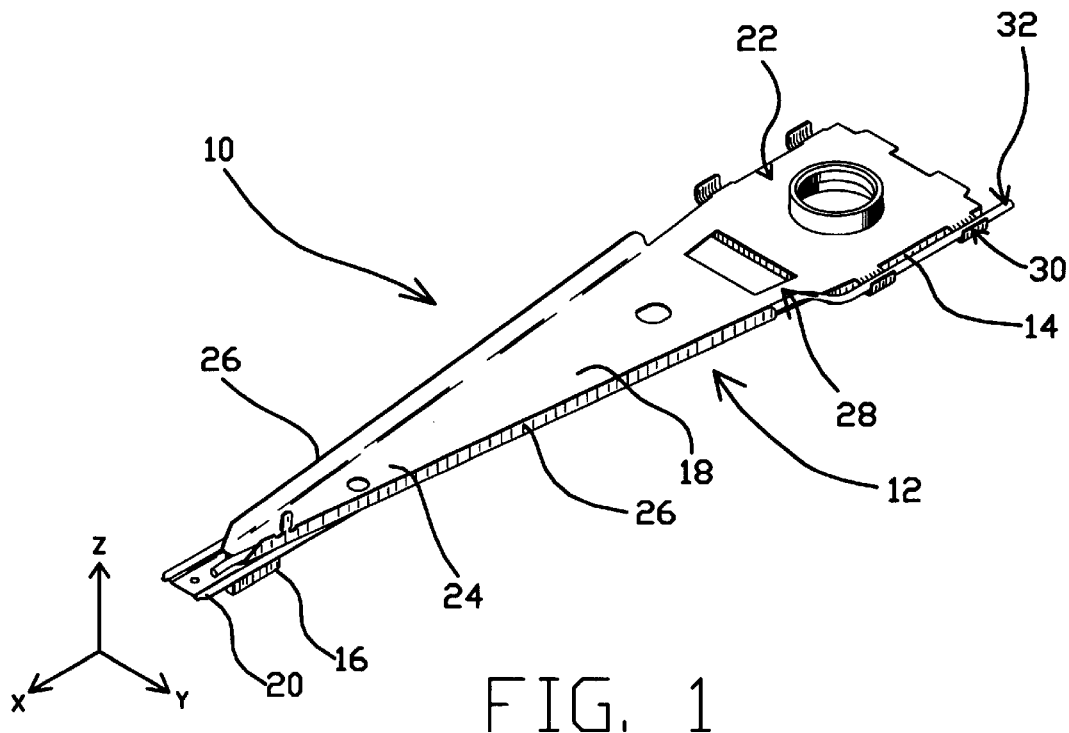
FIG. 1 is an isometric view of a head suspension assembly including a suspension of the type which can be designed and manufactured in accordance with the present invention.
Figure 2:
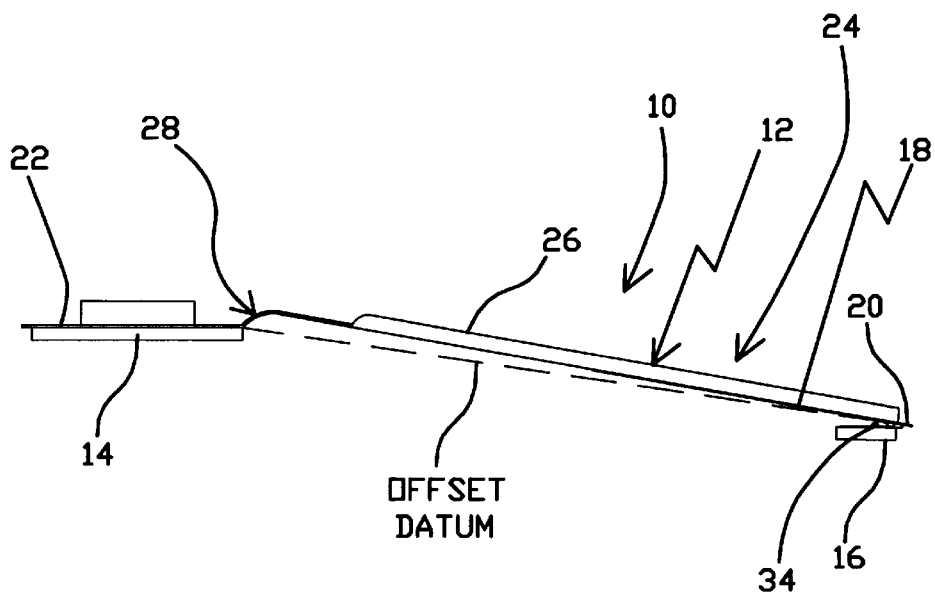
FIG. 2 is a side view of the suspension assembly shown in FIG. 1.

A head suspension assembly 10 including a suspension 12 which can be designed and manufactured in accordance with the present invention is illustrated generally in FIGS. 1 and 2. In addition to suspension 12, suspension assembly 10 includes baseplate 14 and air bearing head slider 16. Suspension 12 includes an elongated and generally triangularly shaped load beam 18 and a flexure 20 on a distal end of the load beam. Baseplate 14 is welded to mounting region 22 on the proximal end of the load beam 18. Load beam 18 also includes a relatively rigid region 24 having side rails 26, and a radius or spring region 28 between the rigid region and mounting region 22. Wire captures 30 can be formed in the load beam 18 to support lead wires 32 extending from the read/write head (not visible) on the head slider 16. In the embodiment shown, the flexure 20 includes a load point dimple 34 which engages the distal end of the load beam 18 and spaces the portion of the flexure to which the head slider 16 is attached away from the load beam. When the suspension assembly 10 is incorporated into a disk drive (not shown), dimple 34 effectively functions as a pivot point on which the flexure 20 and head slider 16 can move or "gimbal" about pitch (y-axis) and roll (x-axis) directions to accurately follow the surface topography of the spinning disk (also not shown) over which it is flying. In other embodiments of suspension assembly 10 (not shown), the dimple is located on the load beam and extends toward and engages the flexure 20.

The side profile of suspension assembly 10 (i.e., the shape of the load beam 18 as seem from the side) can be observed in FIG. 2. This side profile can be characterized or described in terms of the distance between the planar surface or web of the load beam 18 and a reference or offset datum. In the example shown in FIG. 2 and used for purposes of convention throughout the remainder of this description, the offset datum OD is a line extending from the portion of the spring region 28 closest to the mounting region 22 through the gimbal point at which the gimbal 34 contacts load beam 18. The distance between the offset datum and the load beam at any location is referred to as the "height" or "offset height" of the load beam or suspension.

Figure 3:
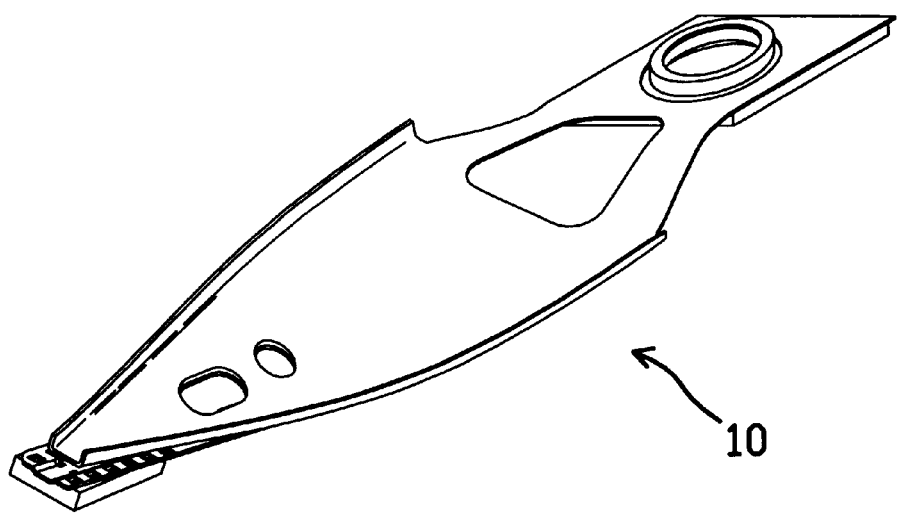
FIG. 3 is an isometric view of the suspension assembly shown in FIG. 1 undergoing twisting motion in the first torsion mode.
Figure 4:
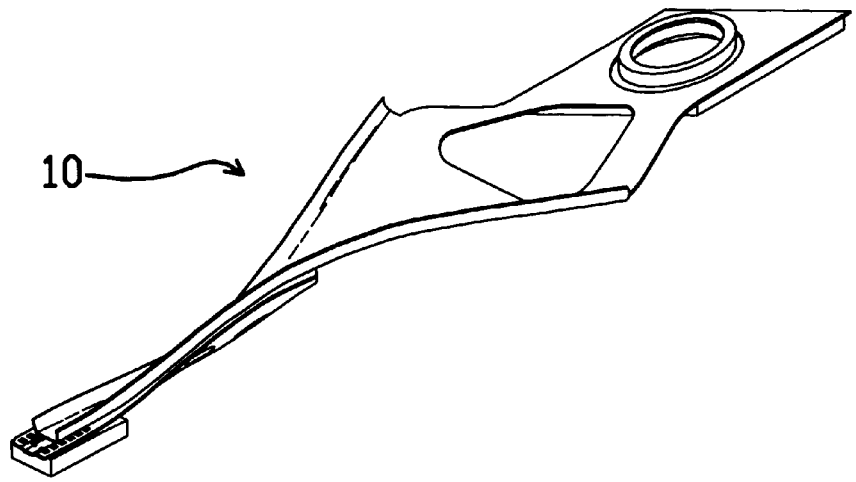
FIG. 4 is an isometric view of the suspension assembly shown in FIG. 1 undergoing twisting motion in the second torsion mode.
Figure 5:
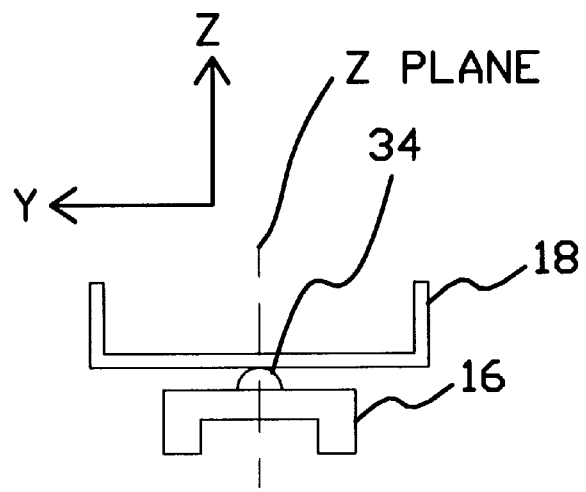
FIG. 5 is a detailed end view of the suspension assembly shown in FIG. 1, illustrating the contact between the dimple and the load beam.
Figure 6:
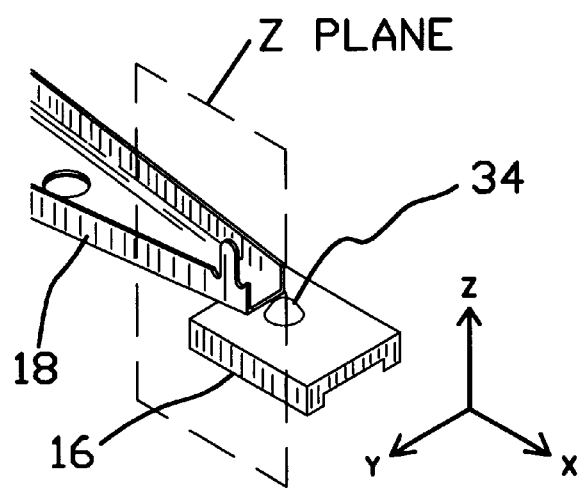
FIG. 6 is a detailed isometric view of the distal end of the suspension assembly shown in FIG. 1, illustrating the contact between the dimple and the load beam.
Figure 7:
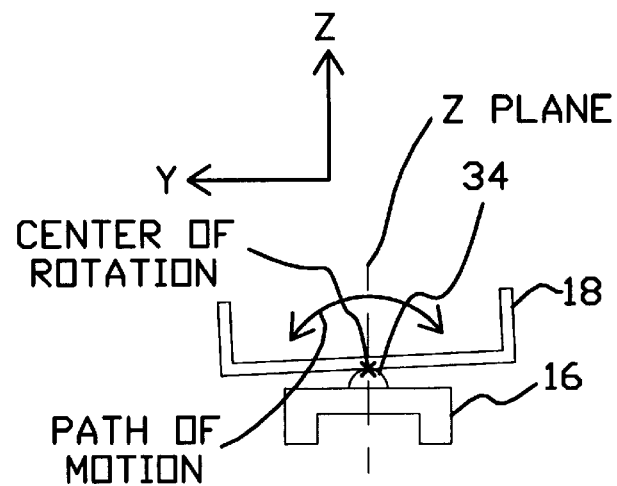
FIG. 7 is a detailed end view of a suspension assembly such as that shown in FIG. 1, and having a center of rotation aligned with or extending through the point of contact between the dimple and load beam.
Figure 8:
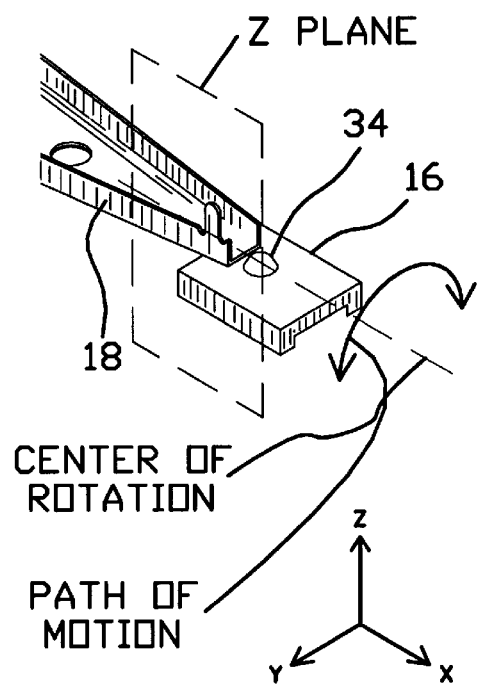
FIG. 8 is a detailed isometric view of the distal end of a suspension assembly such as that shown in FIG. 1, and having a center of rotation aligned with or extending through the point of contact between the dimple and the load beam.
Figure 9:
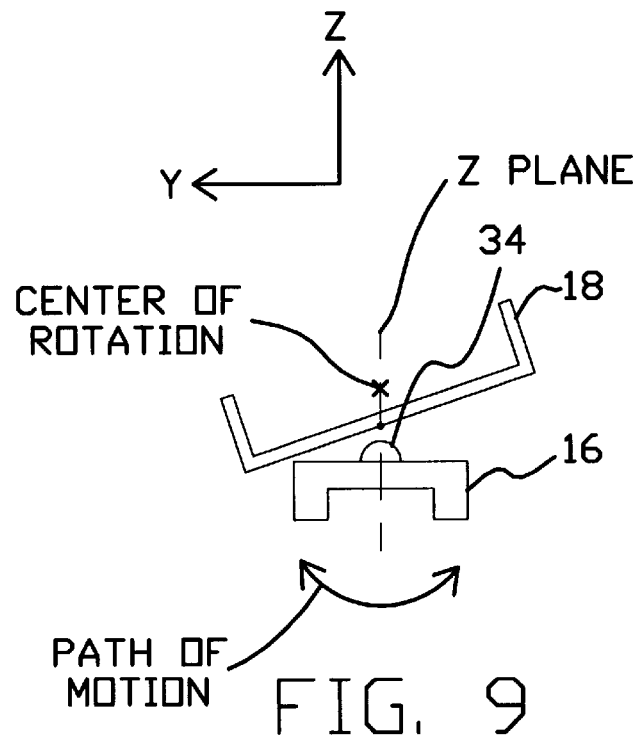
FIG. 9 is a detailed end view of a suspension assembly such as that shown in FIG. 1, and having a center of rotation aligned with or extending through a point which is offset or spaced from the point of contact between the dimple and load beam.
Figure 10:
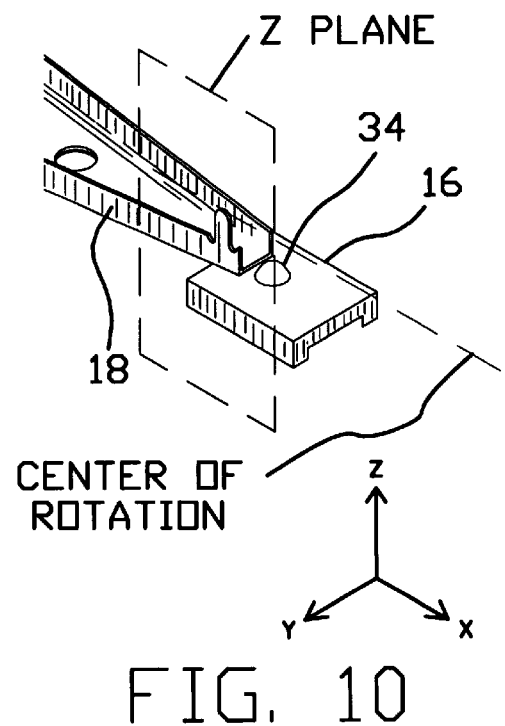
FIG. 10 is a detailed isometric view of the distal end of a suspension assembly such as that shown in FIG. 1, and having a center of rotation aligned with or extending through a point which is offset or spaced from the point of contact between the dimple and the load beam.

As is discussed generally in the Description of the Related Art section of this document, when in operation, suspension assemblies such as 10 bend and twist in a number of different modes when driven back and forth at certain rates of speeds known as resonant frequencies. FIG. 3 is an illustration of suspension assembly 10 undergoing twisting motion in what is known as the first torsion mode. FIG. 4 is an illustration of suspension assembly 10 undergoing twisting motion in what is known as the second torsion mode. In both the first and second torsion modes the load beam 18 of suspension assembly 10 twists or rotates about a central, longitudinally oriented rotational axis which will be located in a z-plane extending vertically through the center of the load beam (for a suspension which is symmetrical about the x-axis). The z-plane is illustrated diagramatically with respect to the load beam 18, dimple 34 and slider 16 in FIGS. 5 and 6. The location of the rotational axis within the z-plane will depend upon a number of factors related to the load beam 18 itself, such as the mass, thickness, stiffness, shape and material properties of the load beam and its rails 26, and the side profile of the load beam. If the rotational axis (center of rotation) about which the load beam rotates when undergoing motion in either first or second torsion modes extends through the point at which dimple 34 contacts load beam 18, as shown in FIGS. 7 and 8, the off-track motion of head slider 16 (i.e., the distance the head slider moves along the y-axis) will be relatively small. If, on the other hand, the rotational axis during motion in either the first or second torsion modes is located away from the contact point between the dimple 34 and load beam 18 as shown for example in FIGS. 9 and 10, the path of off-track motion of the head slider will be relatively large. Since the greater the distance of the rotational axis of the suspension assembly 10 from the contact point between the dimple 34 and load beam 18 during either of the first and second torsion modes the greater the magnitude of the off-track motion, it is desirable for these rotational axes to be as close to the gimbal point as possible.

Figure 11:
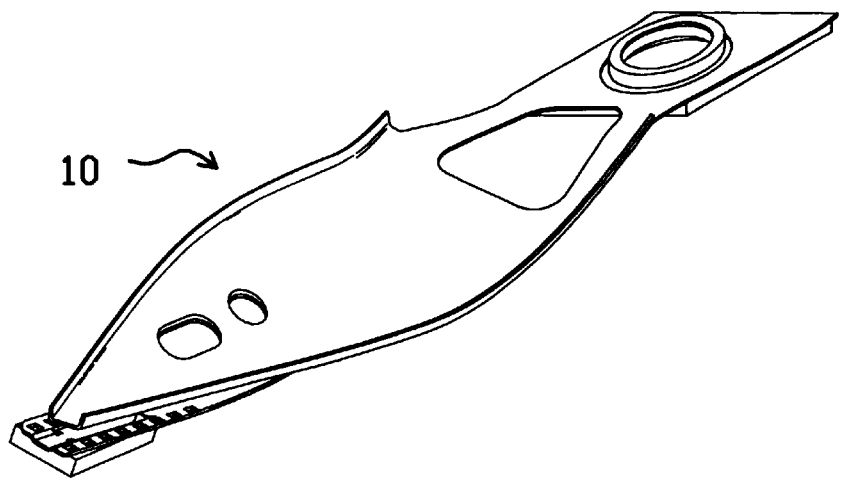
FIG. 11 is an isometric view of the suspension assembly shown in FIG. 1 undergoing bending motion in the sway mode.
Figure 12:
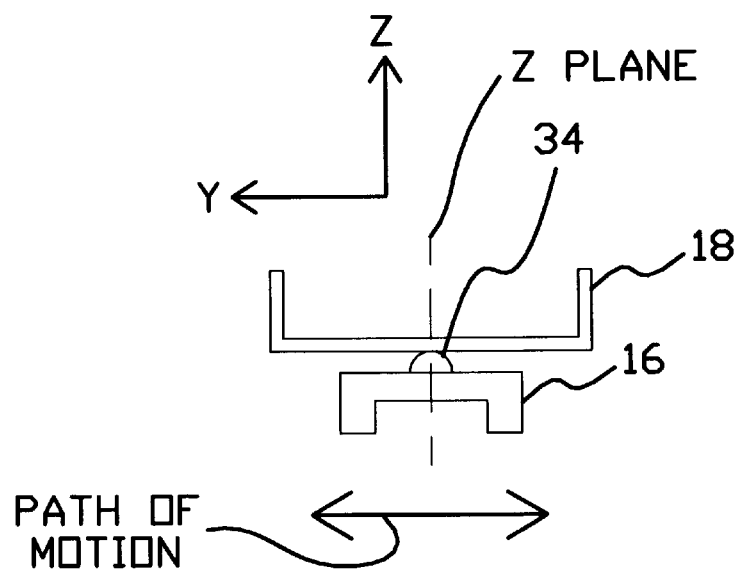
FIG. 12 is a detailed end view of a suspension assembly such as that shown in FIG. 1, illustrating the motion of the head slider in the sway mode.

FIG. 11 is an illustration of suspension assembly 10 undergoing bending motion in what is known as the sway mode. In the sway mode the load beam 18 bends about the y-axis, resulting in off-track motion of head slider 16 about the path of motion illustrated in FIG. 12. Typically, the sway mode exhibits a slight twisting motion as well.

The design methodology of the present invention is used to determine the optimal side profile of suspension assembly 10, and to design tooling that can be used during manufacturing to form the suspension to the desired side profile. This methodology includes designing the shape of the rigid region 24 of the load beam 18, and preferably both the rigid region and the spring region 28 of the load beam. The profile is optimized for at least one, but preferably two or more resonance characteristics.

In the embodiments described below, the invention is used to design and form the optimal side profile of a load beam 18 for its first and second torsion modes. In other words, the load beam 18 is designed to have a side profile which will produce relatively low amounts of off-track motion of the head slider 16 when the load beam is twisting in its first and second torsion modes. The first and second torsion modes are therefore the resonance characteristics for which the suspension assembly 10 is designed in these embodiments.

As described above, the amount of off-track motion produced by the load beam 18 during its first and second torsion modes is related to the location of the rotational axis (i.e., the center of rotation of the load beam at each point along its length), and can be minimized if the rotational axis extends generally through the gimbal point. The action or response of the load beam 18 to the first and second torsion modes can therefore be characterized or related to the position of the center of rotation of the load beam. Accordingly, the position of the center of rotation is the used in the following example of the method as a resonance characteristic response. The center of rotation for the first torsion mode is referred to as CR1, and the center of rotation of the second torsion mode is referred to as CR2.

Figure 14:
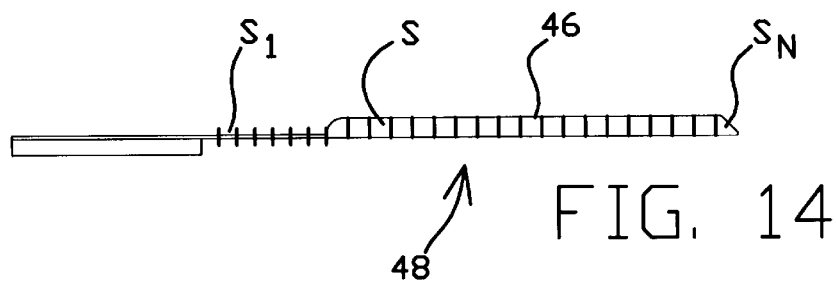
FIG. 14 is a graphical illustration of a finite element analysis (FEA) model of a suspension assembly.

Suspension profile design method 40 can be described generally with reference to FIG. 13. As shown at Step I, method 40 makes use of a model of the load beam 18 of the suspension 10 for which the optimum profile is being determined. The model is initially provided in what is referred to as a 0 gram load and 0 offset height state. In the 0 gram load and 0 offset height state (i.e., unloaded or free state) the surface of the spring region 28 and rigid region 24 of the model are flat and coplanar with the mounting region 22. In the preferred embodiment of method 40 described herein, the load beam model is provided in computerized mathematical form using a finite element analysis (FEA) computer software program. A graphical representation of a 0 gram load and 0 offset height FEA load beam model 48 is shown in FIG. 14. The use of FEA software to create models such as 48 is generally known. The rails 46 of the model 48 are shown divided into sections s to represent the manner by which the FEA software represents model 48 in terms of a plurality of relatively small and adjacent sections. The more accurately the model 48 represents the actual load beam 18 for which the profile is being determined (e.g., the shape, geometry and thickness of the load beam and rails), the more accurately the profile generated by method 40 will be optimized for the suspension. For purposes of illustration in FIG. 14, suspension model 48 is shown as a composite of N adjacent sections s (i.e., $s_1, s_2, s_3, \ldots S_N$)

Step II of method 40 is the generation of a plurality of profile/resonance characterizing variations of the model.

Figure 15:
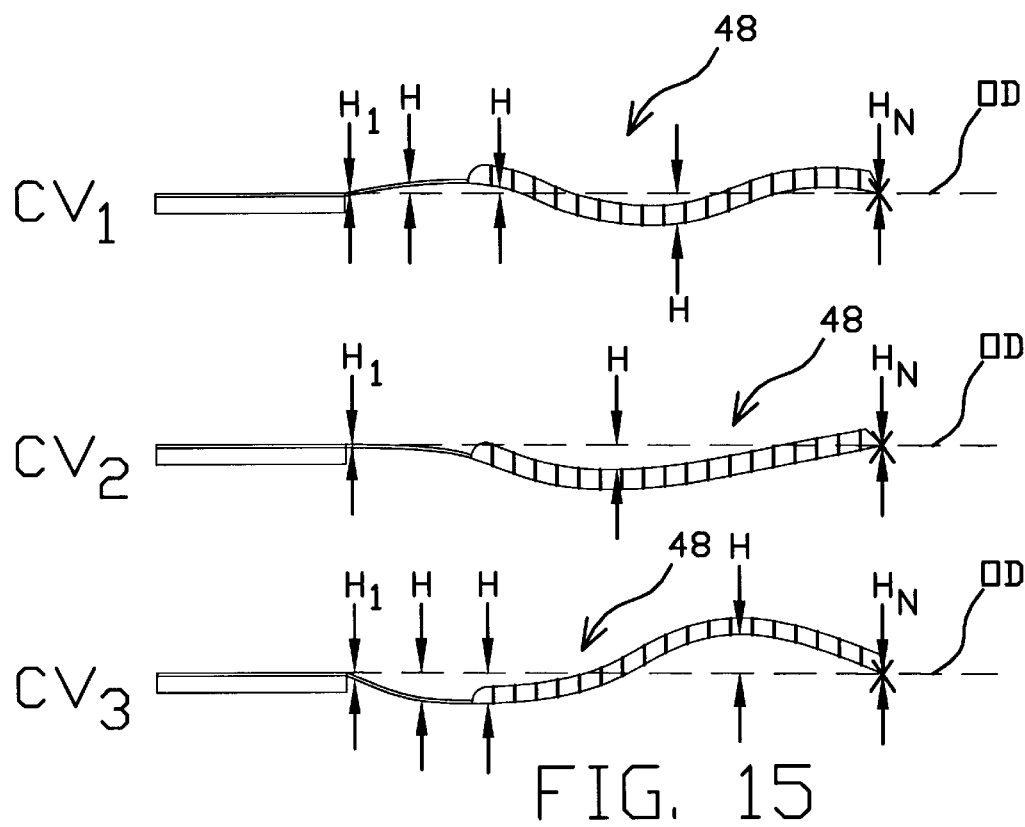
FIG. 15 is a graphical illustration of several characterizing variations of the FEA suspension model shown in FIG. 14 with different side profiles.

The result of Step II is a plurality of characterizing variations of model 48 having a range of different side profiles. The characterizing variations have different side profiles in at least the rigid region, and preferably in both the rigid region and the radius region. The characterizing variations will therefore have a range of different centers of rotation. Using the FEA model 48 provided in Step I, the characterizing variations can be generated by using the FEA software to add random height components to the model along its length. Care should be taken to assure that the proper length of the load beam is maintained when the random height variations are added using the FEA approach. Approximately two-hundred characterizing variations of the FEA model 48 are generated during the implementation of one embodiment of method 40. Graphical representations of three profile/resonance characterizing variations $CV_1$–$CV_3$ of model 48, and the offset datum OD, are shown in FIG. 15.

During Step III of method 40 the side profile description and resonance characteristic response of each characterizing variation of model 48 is determined for each resonance characteristic for which the model is being optimized. The side profile description of each characterizing variation of the model 48 can be specified mathematically in terms of the offset height H of the characterizing variation at each section s along the length of the model 48 (i.e., $H_1, H_2, H_3, \ldots H_N$). In FIG. 15 the offset height H of characterizing variations $CV_1$–$CV_3$ are shown at several locations for purposes of illustration. The center of rotation (i.e., the resonance characteristic response) of each characterizing variation at both the first and second torsion modes (CR1 and CR2) can be determined in a conventional manner using the FEA software. The information generated by Step III for the described example, therefore, is a description of the side profile of each characterizing variation, the location of the center of rotation of each characterizing variation when the variation is undergoing twisting motion in its first torsion mode, and the location of the center of rotation of each characterizing variation when the variation is undergoing twisting motion in its second torsion mode.

During Step IV the information generated at Step III is used to generate a numeric profile/resonance equation for each resonance characteristic for which the design is being optimized. Each profile/resonance equation describes the resonance characteristic response of the load beam model 48 as a function of the profile of the load beam. In a preferred embodiment of the example used herein, linear equations such as Equation 1 and Equation 2 below are generated.

$$CR1 = kCR1_0 + kCR1_1 h_1 + kCR1_2 h_2 + \ldots kCR1_N h_N \qquad \text{Eq. 1}$$

$$CR2 = kCR2_0 + kCR2_1 h_1 + kCR2_2 h_2 + \ldots kCR2_N h_N \qquad \text{Eq. 2}$$

where:
CR1=location of center of rotation of first torsion mode
CR2=location of center of rotation of second torsion mode
$kCR1_n$=coefficient at load beam section n for first torsion mode
$kCR2_n$=coefficient at load beam section n for second torsion mode
$h_n$ 32 offset height at load beam section n The profile/resonance equations describing CR1 and CR2 can be generated by conventional computational techniques, such as through the use of a least squares or other regression method. These computations can be performed on a computer. In effect, the generation of the profile/resonance equations results in the calculation of the N coefficients $kCR1_n$ and $kCR2_n$ (i.e., the value of the coefficient at each of the N sections $s_n$). The profile/resonance equations therefore describe the center of rotation for each torsion mode as a function of the coefficients and the height at each section $s_n$ of the suspension. Since the desired center of rotation is known (e.g. preferably essentially zero for the suspension 10 shown in FIGS. 1 and 2), Equations 1 and 2 can be solved for the desired offset heights h at each of the N sections $s_n$ to determine the optimized side profile of the suspension.

Figure 16:
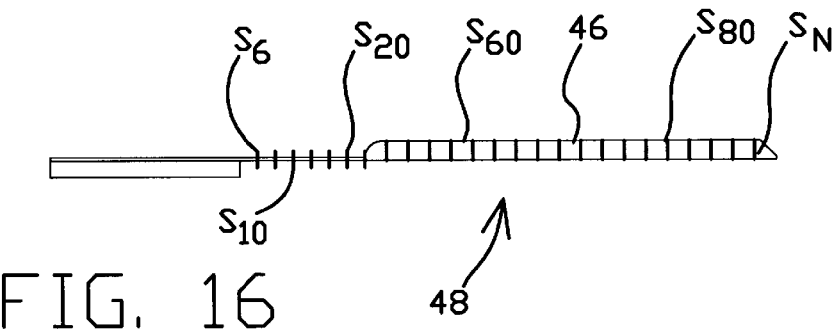
FIG. 16 is an illustration of the FEA suspension model shown in FIG. 14, with specific sections identified.

There are, however, many solutions (i.e., side profiles) to Equations 1 and 2 since there are more unknowns than equations. To solve Equations 1 and 2 for a side profile that can be used in the suspension 10, constraints are imposed onto the profile/resonance equations to limit the number of possible solutions to those that can be effectively used (e.g., formed into the suspension 10). This process is described generally by Step V. Any of a number of different constraints can be used for this purpose. In the embodiment of the invention described herein, for example, not all N offset heights $h_n$ are calculated directly from Equations 1 and 2, Instead, only a limited number (e.g., five) of the offset heights $h_n$ are used and determined. The remaining offset heights $h_n$ are then determined as a function of the directly calculated offset heights through the use of a spline or other curve fitting calculation method. Furthermore, the location of the offset heights $h_n$ that are directly calculated can be selected on the basis of empirical knowledge of which sections $s_n$ of the suspension model 48 have the greatest resonance sensitivity to the offset height. In other words, the resonance characteristics of the suspension model 48 are known to be most sensitive, and determined to a relatively high degree, by the offset height at the high sensitivity locations. It is known, for example, that the resonance response of suspensions such as 10 are highly sensitive to their side profile in the spring region 28, and to a lesser degree sensitive to their side profile in the rigid region 24. If for purposes of example it is determined that five offset heights $h_n$ are to be calculated directly to solve Equations 1 and 2, three of the selected offset heights can be in the spring region of model 48 (e.g., $h_5$, $h_{10}$ and $h_{20}$), and the other two offset heights in the rigid region (e.g., $h_{50}$ and $h_{80}$). FIG. 16 is a graphical representation of suspension model 46 illustrating the sections $s_5$, $s_{10}$, $s_{20}$, $s_{50}$ and $s_{80}$ of the selected limited set of offset heights $h_5$, $h_{10}$ and $h_{20}$ $h_{50}$ and $h_{80}$. By limiting Equations 1 and 2 on the basis of the sensitivity constraints described above, these equations are effectively reduced to limited or approximations Equations 3 and 4, respectively.

$$CR1 \sim kCR1_0 + kCR1_5 h_5 + kCR1_{10} h_{10} + kCR1_{20} h_{20} + kCR1_{50} h_{50} + kCR1_{80} h_{80} \qquad \text{Eq. 3}$$

$$CR2 \sim kCR2_0 + kCR2_5 h_5 + kCR2_{10} h_{10} + kCR2_{20} h_{20} + kCR2_{50} h_{50} + kCR2_{80} h_{80} \qquad \text{Eq. 4}$$

The number of possible solutions to Equations 1 and 2 can also be limited by imposing manufacturing constraints. For example, the suspension 10 will typically be incorporated into a head stack assembly for use in connection with closely spaced disks. The maximum offset height of the suspension at any point along its length with respect to the mounting region is therefore limited to a distance less than the disk-to-disk spacing. The maximum values of the offset heights can therefore be imposed as a manufacturing constraint to limit the range of possible solutions to Equations 1 and 2. This manufacturing constraint can be described generally by Equation 5.

$$\text{Absolute Value } (h_1, h_2, h_3, \ldots \text{ and } hN) < X \qquad \text{Eq. 5}$$

where:
X=maximum offset height with respect to the suspension mounting region

Another manufacturing constraint that can be used to limit the number of solutions to Equations 1 and 2 is based upon the knowledge that the stainless steel from which the load beam is formed can only be bent a certain amount over any given distance. In other words, the difference in offset heights between adjacent sections s is limited to certain maximum amounts (i.e., the maximum rate of change is limited). Furthermore, the maximum rate of change will be greater in the spring region than in the rigid region of the load beam since the rails limit the degree to which the rigid region can be bent. These manufacturing constraints can be described generally by Equations such as 6 and 7.

$$\text{Absolute Value } (h_{i,radius} - h_{i+j,radius}) < Y \qquad \text{Eq. 6}$$

where:

$h_{i,radius}$ and $h_{i+j,radius}$ are offset heights at two predetermined sections in the radius region of the load beam Y=maximum offset height change in the radius region of the load beam $$\text{Absolute Value of } (h_{i,rigid} - h_{i+j,rigid}) < Z \qquad \text{Eq. 7}$$

where:

$h_{i,rigid}$ and $h_{i+j,rigid}$ are offset heights at two predetermined sections in the rigid region of the load beam Z=maximum offset height change in the rigid region of the load beam After establishing limitations such as those described above, the profile/resonance equations can be solved as described generally by Step VI. Conventional computational techniques can be performed using a computer for this step. For example, Equations 3 and 4 can be solved for an initial set of five possible offset heights $h_5$, $h_{10}$ and $h_{20}$ $h_{50}$ and $h_{80}$. Initial set offset heights $h_5$, $h_{10}$ and $h_{20}$ $h_{50}$ and $h_{80}$ are then applied to Equations 5–8 to determine whether these solutions meet the constraints. If not, the procedure is repeated by again solving Equations 3 and 4 for another set of possible offset heights, and applying the set to Equations 5–8. After a set of possible offset heights $h_5$, $h_{10}$, $h_{20}$, $h_{50}$ and $h_{80}$ which meets the constraints of Equations 5–8 is identified, these offset heights can be fit to a curve using a spline or other curve fitting algorithm, and the remaining offset heights $h_1$–$h_4$, $h_6$–$h_9$, $h_{11}$–$h_{19}$, $h_{21}$–$h_{49}$, $h_{51}$–$h_{79}$ and $h_{81}$–$h_N$ determined. Calculated offset heights $h_1$–$h_4$, $h_6$–$h_9$, $h_{11}$–$h_{19}$, $h_{21}$–$h_{49}$, $h_{51}$–$h_{79}$ and $h_{81}$–$h_N$ are then applied to Equations 5–8 to determine whether these solutions meet the constraints. If not, the procedures described above are repeated. After a set of possible offset heights $h_1$–$h_N$ which are solutions to all Equations 3–8 are identified, these offset heights are substituted back into Equations 1 and 2 and evaluated to determine whether they result in centers of rotation which are within a predetermined tolerance range of the desired values of CR1 and CR2. If not, the procedures described above are repeated until a set of offset heights $h_1$–$h_N$ which satisfy all the required criteria, and therefore describe an optimized side profile, are produced.

Figure 17:
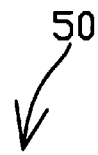
FIG. 17 is a description of the loaded state profile compensating design method of the present invention.

Method 40 described above will produce an optimal profile for the suspension 10 when the suspension is at its operational or loaded state (i.e., when at fly height). However, in suspensions such as 10 described above having an elongated spring region 28, the side profile of the load beam 18 in the spring region will change as the load beam is loaded and moves from its free state to its loaded state. These changes in profile can be compensated for by effectively subtracting out the changes. This loaded state is performed by determining the unloaded or free state profile of the load beam 18 that will have the desired profile determined by method 40 after it is placed in its loaded state. A loaded state compensation method 50 which is used to determine the load compensated free state of the load beam 18 can be described generally with reference to FIG. 17.

As shown by Step I, the 0 gram load, 0 offset FEA model 48 of the load beam 18 is loaded by applying to the distal end of the load beam (i.e., and the gimbal contact point) a load which corresponds to the gram load for which the suspension is designed. This gram load will result in the load beam of model 48 being deflected to a baseline loaded state. The profile of the model 48 in the baseline loaded state is then determined as indicated by Step II. To determine the optimum load compensated free state side profile of the suspension, the baseline loaded state profile is subtracted from the optimal loaded state side profile generated by method 40.

Figure 18A:
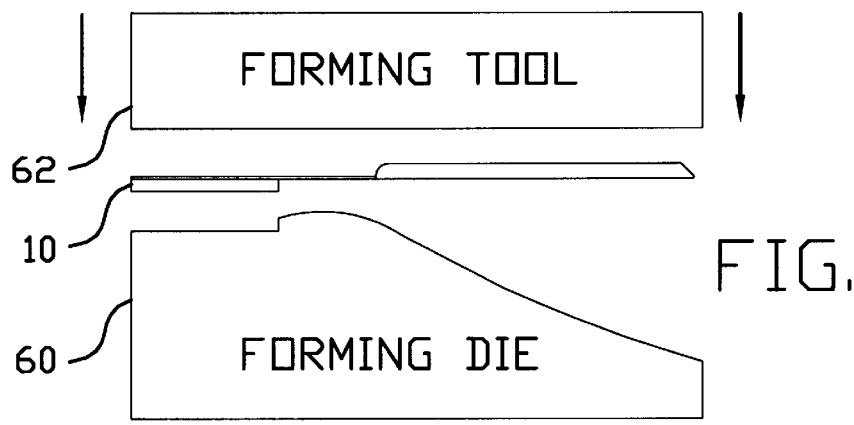
FIGS. 18A–18C are diagrammatic illustrations of a flat suspension assembly being formed by a forming die and forming tool.
Figure 18B:
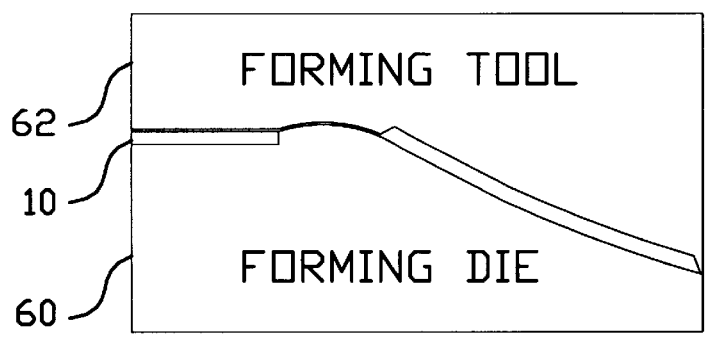
Figure 18C:
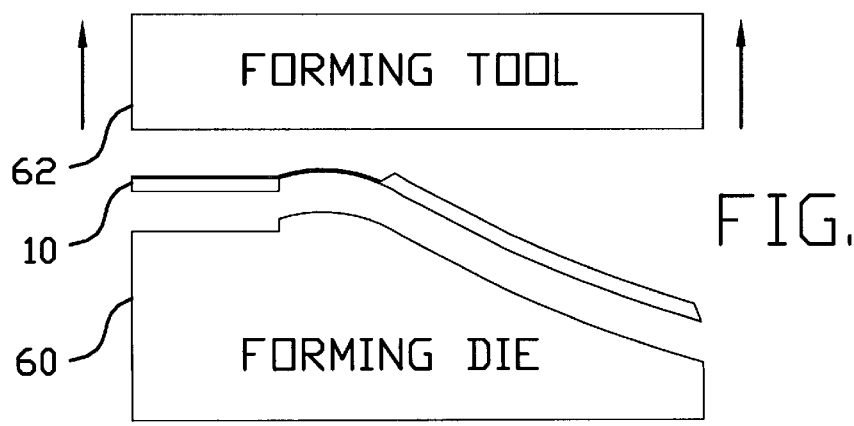

The manufacturing method by which a flat suspension 10 is formed so as to have the optimized load compensated free state profile can be described generally with reference to FIGS. 18A–18C. As shown, the side profile of suspension 10 is formed through the use of a forming die 60 and forming tool 62. Suspension forming tooling such as die 60 and forming tool 62 are well known, and are shown diagramatically for purposes of illustration in FIGS. 18A–18C. The forming die 60 has a side profile which will impart the optimized load compensated free state profile to suspension 10, but as described below, is not the same profile as the optimized load compensated free state profile. During the forming operation a flat suspension 10 is positioned between the forming die 60 and forming tool 62, and the forming tool driven toward the forming die to force the suspension into engagement with the die (FIGS. 18A and 18B). The load beam is thereby plastically (i.e., permanently) bent or deformed. The forming tool is then withdrawn (FIG. 18C) to release the suspension 10 from the forming die 60. The stainless steel from which the suspension 10 is formed is resilient, and as is illustrated diagramatically in FIG. 18C, does not form exactly to the side profile of the forming die 60. The difference in side profile shape between the side profile of the forming die 60 and the free state profile of a suspension 10 formed on the forming die is known as the springback. The forming die 60 must therefore have a side profile which is compensated for the springback (e.g., a side profile effectively equal to the sum of the optimized load compensated free state profile and the springback).

An iterative method 70 for using computerized FEA to determine the side profile of a forming die 60 which will impart the optimized load compensated free state profile to suspension 10 during the forming operation can be described generally with reference to FIG. 19. In addition to using a computerized FEA model of suspension 10, the method 70 makes use of programmed data which describes the stress-strain curve of the suspension. Programmed stress-strain curves and their use in computerized FEA are generally known. The stress-strain curve is information which is used to determine the amount of plastic (i.e., permanent) and elastic (i.e., temporary because to the resilient nature) deformation which will be imparted to a suspension 10 by a given amount of movement of the suspension from its then-current free state.

Step I of the method 70 involves adding displacement constraints to the 0 gram load, 0 offset suspension model 48 that will cause the model to have a deformed profile. During the initial iteration of method 70, the deformed profile is set equal to the optimized load compensated free state profile. In effect, Step I involves using the FEA program to force the suspension model 48 into the deformed profile. A plastic stress analysis is then performed on the suspension model 48 at the deformed profile using the stress-strain curve (Step II). The information produced by this analysis is used to compute the resulting free state profile of the suspension model after the displacements are removed (Step III). A correction profile is then computed by subtracting the resulting free state profile from the optimized load compensated free state profile (Step IV). The correction profile is then added to the previous deformed profile to determine a next deformed profile iteration (Step V). Steps I–IV are repeated for each new deformed profile iteration until the resulting free state profile determined at Step III is equal to the optimized load compensated free state profile. The then-current deformed profile of the suspension model 48 is equal to the side profile of a forming die 60 which will impart the optimized load compensated free state profile into a flat suspension 10 during the forming operation.

Figure 20:
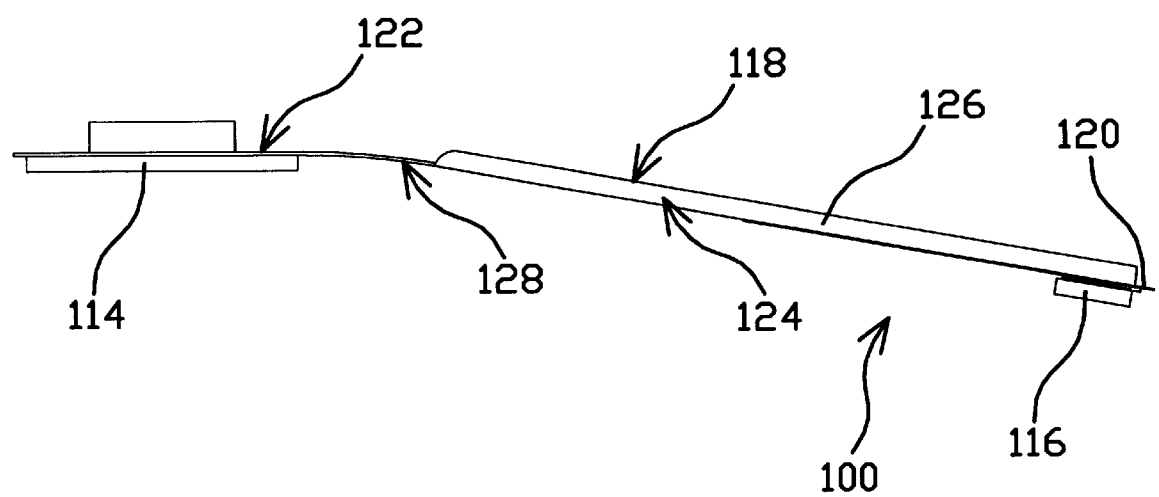
FIG. 20 is a side view of a second embodiment of a head suspension assembly including a suspension of the type which can be designed and manufactured in accordance with the present invention.

In the examples provided above, methods 40, 50 and 70 are used to design the side profile of and forming die for a suspension 10 having an elongated spring region 28. Loaded state compensation method 50 was used to compensate for the changes in the profile of the spring region 28 when the suspension 10 is deflected from its free state to its loaded state. Another suspension design, shown generally at 100 in FIG. 20, has a very narrow spring region 128 between the rigid region 124 and mounting region 122 of the load beam 118. A flexure 120 shown with a slider 116 bonded thereto is located on the distal end of the load beam 118. Rigid region 124 of the load beam 118 includes side rails 126 and extends substantially the entire distance between the mounting region 122 and the distal end of the load beam. Spring region 128 is relatively short in length, and can include a sharp crease or a relatively small radius bend. A short partial etch across the width of the load beam 118 at the spring region 128 can also be used to form a hinge. Suspensions such as 100 are described in greater detail in commonly-assigned U.S. patent application Ser. No. 08/659,902, filed Jun. 7, 1996 and entitled Head Suspension With Improved Load Control, which is hereby incorporated by reference in its entirety for all purposes.

A characteristic of suspension such as 100 is that the side profile of the load beam 118 changes by a relatively small amount when the suspension is forced from its free state to its loaded state. The side profile characteristics of the suspension 100 are therefore effectively decoupled from the gram load characteristics of the suspension. Therefore, when the present invention is used in connection with suspensions such as 100, the load often does not substantially affect the side profile. Under these circumstances the loaded state compensation method 50 need not be performed.

In the example of the invention described above, methods 40, 50 and 70 have been performed to a large degree using finite element analysis (FEA) computer modeling techniques. However, the invention can also be performed using other computational methodologies and/or experimentally. For example, rather than using FEA model 48 in method 40, an actual physical model of the suspension can be constructed, and the physical model manually bent to a number of different profile/resonance characterizing variations. Conventional laser scanning or other techniques can then be used to determine the side profile of the profile/resonance characterizing variations, and the associated resonance characteristic responses of the variations determined through the use of commercially available or otherwise known resonance testing instrumentation.

Although the invention has been described with reference to the optimization of both the first and second torsion modes, it can be used to optimize the suspension profile for either of these modes individually. The invention can also be used to optimize the profile for one or more other modes such as sway or higher order torsion modes, either individually or in combination with the first and second torsion modes. Other resonance characteristic responses such as the shear center and a center of gravity of the suspension can also be used in connection with the method.

The invention offers considerable advantages, especially when used in connection with FEA. Desirable load beam side profiles can be determined to a high degree of accuracy. The ability to optimize the profile for two or more resonance characteristics greatly enhances the performance of the resulting suspension. The method is also relatively efficient to perform.

Although the present invention has been described with reference to preferred embodiments, those skilled in the art will recognize that changes can be made in form and detail without departing from the spirit and scope of the invention.

What is claimed is:

1. A method for developing and manufacturing a head suspension of the type having a load beam, a mounting region on a proximal end of the load beam, a flexure on a distal end of the load beam, a rigid region and a spring region between the rigid region and the mounting region, and which has at least a rigid region side profile optimized for one or more selected resonance char method including:

providing a flat model of the suspension;

generating a plurality of profile/resonance characterizing variations of the model, each characterizing variation having a different side profile through at least the rigid region of the suspension;

determining, for each selected resonance characteristic, a profile description and resonance characteristic response of each profile/resonance characterizing variation;

generating, for each selected resonance characteristic and from the profile description and resonance characteristic response of the profile/resonance characterizing variations, a numeric profile/resonance equation describing the resonance characteristic response of the suspension as a function of the profile;

determining an optimum suspension profile description by solving the profile/resonance equations for the desired resonance characteristic response; and manufacturing one or more suspensions having the determined optimum suspension profile.

2. The method of claim 1 wherein:

providing a model of the suspension includes providing a numeric finite element analysis (FEA) model of the suspension; and generating the profile/resonance characterizing variations of the model includes generating FEA iterations of the model having random side profile variations.

3. The method of claim 2 wherein generating the numeric profile/resonance equations includes performing a regression on the profile description and resonance characteristic response of the profile/resonance characterizing variations.

4. The method of claim 1 and further including limiting the range of possible solutions to each profile/resonance equation before solving the equations.

5. The method of claim 4 wherein limiting the range of possible solutions to each profile/resonance equation includes limiting the range of solutions on the basis of suspension manufacturing constraints.

6. The method of claim 4 wherein limiting the range of possible solutions to each profile/resonance equation includes limiting the range of solutions on the basis of suspension sensitivity constraints.

7. The method of claim 1 for determining an optimum loaded state side profile of the suspension, and further including a loaded state compensation method for determining an optimum load compensated free state side profile of the suspension, including:

determining a compensation profile description of the flat model of the suspension at a desired loaded state; and subtracting the compensation profile from the optimum loaded state side profile of the suspension to determine the optimum load compensated free state side profile of the suspension.

8. A method for developing and manufacturing a head suspension of the type having a load beam, a mounting region on a proximal end of the load beam, a flexure on a distal end of the load beam, a rigid region and a spring region between the rigid region and the mounting region, and which has a load beam spring region and a rigid region side profile optimized for first and second torsion resonance characteristics, including:

providing a numeric finite element analysis (FEA) flat model of the suspension;

generating FEA profile/resonance characterizing iterations of the model having random side profile variations;

generating a set of first torsion iteration descriptions, including a profile description and first torsion resonance characteristic response for each FEA profile/resonance characterizing iteration;

generating a set of second torsion iteration descriptions, including a profile description and second torsion resonance characteristic response for each FEA profile/resonance characterizing iteration;

generating, from the set of first torsion iteration descriptions, a first torsion profile/resonance equation describing the first torsion characteristic response of the FEA model as a function of the profile;

generating, from the set of second torsion iteration descriptions, a second torsion profile/resonance equation describing the second torsion characteristic response of the FEA model as a function of the profile;

limiting the range of possible solutions to the first and second torsion profile/resonance equations;

determining an optimum suspension profile description by solving the first and second torsion profile/resonance equations for desired first and second torsion characteristic responses; and manufacturing one or more suspensions having the determined optimum suspension profile.

9. The method of claim 8 wherein:

generating the first torsion profile/resonance equation includes performing a regression on the set of first torsion iteration descriptions; and generating the second torsion profile/resonance equation includes performing a regression on the set of second torsion iteration descriptions.

10. The method of claim 8 wherein limiting the range of possible solutions to the first and second torsion profile/resonance equations includes limiting the range of solutions on the basis of suspension manufacturing constraints.

11. The method of claim 8 wherein limiting the range of possible solutions to the first and second torsion profile/resonance equations includes limiting the range of solutions on the basis of suspension sensitivity constraints.

12. The method of claim 8 wherein limiting the range of possible solutions to the first and second torsion profile/resonance equations includes limiting the range of solutions on the basis of suspension manufacturing constraints and suspension sensitivity constraints.

13. The method of claim 8 for determining an optimum loaded state side profile of the suspension, and further including a loaded state compensation method for determining an optimum free state side profile of the suspension, including:

generating a compensation side profile description of the FEA model at a desired loaded state; and subtracting the compensation side profile description from the optimum loaded state side profile to determine the optimum load compensated free state side profile of the suspension.

14. The method of claim 13 and further including generating an optimized forming tool profile which can be used to form the optimum load compensated free state profile in a flat suspension.

15. The method of claim 14 wherein the step of manufacturing one or more suspensions includes:

providing a forming tool having the optimized forming tool profile; and forming flat suspensions on the forming tool to impart the optimum load compensated free state profile to the suspensions.

16. The method of claim 8 and further including generating an optimized forming tool profile which can be used to form the optimized side profile in a flat suspension.

17. The method of claim 16 wherein the step of manufacturing one or more suspensions includes:

providing a forming tool having the optimized forming tool profile; and forming flat suspensions on the forming tool to impart the optimized side profile to the suspensions.

* * * * *

UNITED STATES PATENT AND TRADEMARK OFFICE
CERTIFICATE OF CORRECTION

PATENT NO : 6,023,574
DATED : February 8, 2000
INVENTOR(S) : Tangren

It is certified that error appears in the above-identified patent and that said Letters Patent is hereby corrected as shown below:

Column 12, line 31, delete "char" and insert therefor --characteristics, the--

Signed and Sealed this

Sixth Day of February, 2001

Attest:

Q. TODD DICKINSON

*Attesting Officer*      *Director of Patents and Trademarks*